Sept. 1, 1925.  
J. D. BRIDGERS  
1,551,927  
RECARBURETOR ATTACHMENT FOR INTERNAL COMBUSTION ENGINES  
Filed Nov. 8, 1921
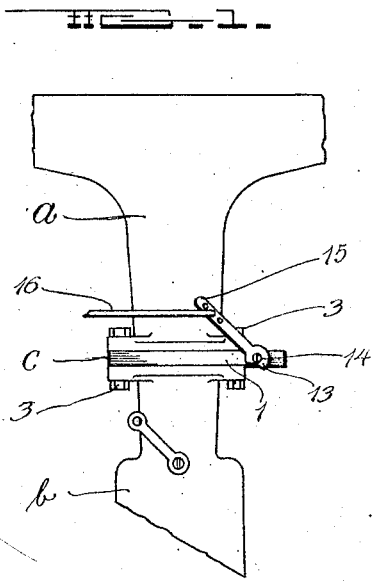
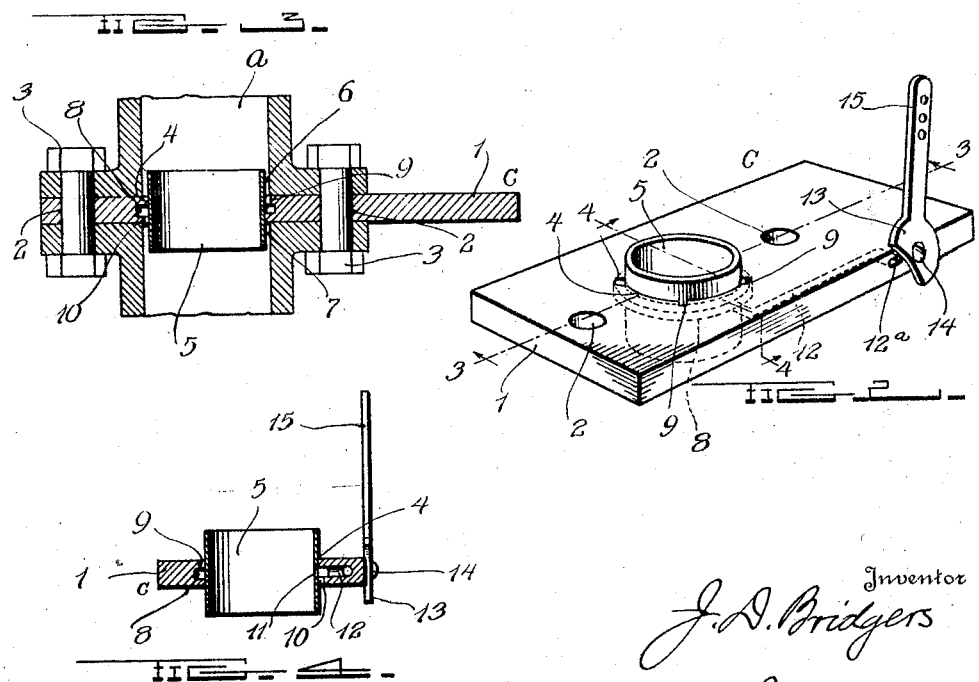
Inventor  
J. D. Bridgers  
By Robert Watson  
Attorney Patented Sept. 1, 1925.

1,551,927

UNITED STATES PATENT OFFICE.

JOHN D. BRIDGERS, OF FLORENCE, SOUTH CAROLINA, ASSIGNOR TO MINNIE C. BRIDGERS, OF FLORENCE, SOUTH CAROLINA.

RECARBURETOR ATTACHMENT FOR INTERNAL-COMBUSTION ENGINES.

Application filed November 8, 1921. Serial No. 513,719.

*To all whom it may concern:*

Be it known that I, JOHN D. BRIDGERS, a citizen of the United States, residing at Florence, in the county of Florence and State of South Carolina, have invented certain new and useful Improvements in Recarburetor Attachments for Internal-Combustion Engines, of which the following is a specification.

This invention relates to a recarburetting attachment for internal combustion engines adapted to atomize any liquid fuel which may condense or collect on the wall of the passageway leading from the carburetor to the engine. In carrying out the invention, I provide a metal plate or fitting adapted to be clamped between the carburetor and the intake manifold of the engine, and which is provided with an opening for the flow of mixture through the plate from the carburetor to the intake manifold. A tubular member fits within this opening and projects at opposite sides of the plate, forming annular flanges concentric with the opening. This member is of slightly smaller diameter than the interior of the adjacent parts of the carburetor and manifold with which it is designed to be used, so that pockets are formed between the tubular member and the adjacent walls of the manifold and carburetor. Between the tubular member and the plate an annular passageway is formed, preferably by grooving the wall of the opening in the plate, and ducts for the passage of liquid fuel extend from the faces of the plate, adjacent said tubular member, to said passageway. The tubular member has a perforation registering with said passageway, and in the plate is formed an air duct or passageway which leads from said annular passageway, opposite the perforation in the tube, to an air inlet orifice which is controlled by a valve.

When the engine is in operation, auxiliary air at atmospheric pressure and in quantity regulated by said valve flows through the passageway in the plate into the annular recess, and thence across said recess and through the opening in the wall of the tubular member and into the main passageway between the carburetor and the intake pipe. This flow of air causes a partial vacuum to be created in the annular recess, and the liquid fuel which collects in the pockets and recess is carried with the air current through the perforation in the tubular member and delivered into the main passageway in an atomized state. The plate may be of any desired form, having a part extending beyond the carburetor and intake to provide an opening to the atmosphere and support a valve for controlling said opening, and the tubular member, while preferably extended on both sides of the plate so as to form pockets above and below it, may be extended on one side of the plate only.

In the accompanying drawing,

Fig. 1 is a side elevation of portions of an intake pipe and carburetor for an internal combustion engine, with my recarburetting attachment clamped between said members;

Fig. 2 is a perspective view of the complete attachment;

Fig. 3 is a section on the line 3—3 of Fig. 2, portions of the carburetor and intake manifold of the engine being shown in section; and, Fig. 4 is a section on the line 4—4 of Fig. 2.

Referring to the drawing, *a* represents the intake pipe of an internal combustion engine, *b* the carburetor, and *c* represents the reatomizing device which, in Fig. 1, is shown clamped between the carburetor and intake manifold. The recarburetting device comprises a flat metal plate or fitting 1, of suitable thickness so that it may be bored and grooved with recesses and passageways, and this plate is provided with bolt holes 2, by means of which it may be secured between the carburetor and intake pipe by suitable bolts 3. The plate 1 is provided with an annular opening 4, of smaller diameter than the internal diameters of the adjacent portions of the carburetor and intake pipe, and within said opening is frictionally or otherwise secured a short tube 5, of relatively thin metal, which projects above and below the plate and, when the latter is bolted in position, forms annular pockets or wells 6 and 7 between the tube and the adjacent walls of the intake pipe and carburetor, respectively. The wall of the opening 4 in the plate is grooved, as shown at 8, forming a recess around the tubular member, and notches 9, cut in the wall of the opening, form ducts for allowing liquid fuel collecting in the pocket 6 to pass into the recess 8. Similar notches 10 lead from the lower face of the plate to the recess 8 and form ducts for permitting any liquid fuel that may collect in the form of drops in the pocket 7 to pass into the annular passageway. The tubular member 5 has an opening or perforation 11, which registers with the passageway 8, and the plate has a duct 12 which extends laterally outward from said passageway, in line with the port or opening 11, and thence extends longitudinally of the plate for some distance, as shown in dotted lines Fig. 2, and terminates in an orifice $12^a$, the opening and closing of which is controlled by a valve 13, pivoted at 14 to the plate and having an arm which may be adjusted from the dashboard of the vehicle by a rod 16.

With the arrangement of parts described, when the engine is in operation, if the valve 13 is moved to open position, air at atmospheric pressure will flow in through the orifice $12^a$ and through the passageway 12, thence across the annular passageway 8 and through the opening or port 11 into the main passageway between the carburetor and the intake pipe. Any liquid particles which may be sprayed upwardly or collect along the wall of the carburetor in the pocket 7, will be sucked into the recess 8 and thence carried with the auxiliary air through the port 11, into the main passageway, and similarly, any condensed fluid or drops collecting on the wall of the intake pipe and flowing downwardly, will enter the pocket 6 and thence pass into the annular passageway and will be sucked through the opening 11 with the inflowing air stream. The fluid thus carried in will be intimately mixed with the air and broken up or atomized.

It will be evident that as the air which enters the passageway 12 is at atmospheric pressure, it will flow through the passageway 12 and orifice 11 with considerable velocity, and this will lower the pressure in the annular passageway 8 below that existing in the main passageway from the carburetor, and hence, any liquid collecting in the pockets will be sucked into said passageway 8, and will thence flow with the air stream through the port 11 in atomized form.

It will be evident that the attachment can be applied to any internal combustion engine by clamping it between the intake pipe and carburetor. The form and size of the plate may be varied, as desired, and the air inlet orifice may be located at any suitable point to suit the desired arrangement of the valve.

What I claim is:

1. The combination with the carburetor and intake manifold of an internal combustion engine, of a fitting between said members having an opening forming a part of the main passageway from the former through the latter, and forming, with the manifold, a pocket for the collection of liquid fuel, said fitting having an auxiliary air passageway leading from the atmosphere to said main passageway and having a fuel duct leading from the pocket into the auxiliary air passageway adjacent its outlet.

2. The combination with the carburetor and intake manifold of an internal combustion engine, of a fitting between said members having an opening forming a part of the main passageway from the former through the latter, and forming, with the manifold, a pocket for the collection of liquid fuel, said fitting having an auxiliary air passageway leading from the atmosphere to said main passageway and having a fuel duct leading from the pocket into the auxiliary air passageway adjacent its outlet, and a valve controlling said auxiliary air passageway.

3. The combination with the carburetor and intake manifold of an internal combustion engine, of a fitting between said members having an opening for the flow of mixture from the carburetor, and having a short tube fitting within said opening and forming, with the intake manifold and the carburetor two annular pockets, said fitting having an annular recess communicating with both of said pockets and with said opening, and having also an auxiliary air passageway for admitting air from the atmosphere through said recess into said opening.

4. A recarburetor attachment for internal combustion engines, comprising a plate adapted to be clamped between the carburetor and intake manifold and having an opening for the flow of mixture from the former to the latter, the wall of said opening having an annular channel and having a duct extending from one face of the plate to said channel, a tubular member fitting within said opening and projecting beyond said face, said member having a port in its wall communicating with said channel, and said plate having a passageway leading from the atmosphere for admitting air into said channel and port.

5. A recarburetor attachment for internal combustion engines, comprising a plate adapted to be clamped between the carburetor and intake manifold and having an opening for the flow of mixture from the former to the latter, the wall of said opening having an annular channel and having ducts extending from both faces of the plate to said channel, a tubular member fitting within said opening and projecting beyond both of said faces, said member having a port communicating with said channel, and said plate having a passageway leading from the atmosphere for admitting air into said channel and port.

In testimony whereof I affix my signature.

JOHN D. BRIDGERS.